(12) United States Patent
Chen

(10) Patent No.: US 11,375,522 B2
(45) Date of Patent: Jun. 28, 2022

(54) BASE STATION AND USER EQUIPMENT WITH PRIORITIZED TRANSMISSION CONSIDERATIONS

(71) Applicant: Institute For Information Industry, Taipei (TW)

(72) Inventor: Chiu-Wen Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 22 days.

(21) Appl. No.: 16/927,592

(22) Filed: Jul. 13, 2020

(65) Prior Publication Data

US 2021/0058944 A1 Feb. 25, 2021

Related U.S. Application Data

(60) Provisional application No. 62/889,050, filed on Aug. 20, 2019.

(51) Int. Cl.
*H04W 4/00* (2018.01)
*H04W 72/12* (2009.01)
(Continued)

(52) U.S. Cl.
CPC ..... *H04W 72/1242* (2013.01); *H04W 72/042* (2013.01); *H04W 72/10* (2013.01); *H04W 76/27* (2018.02)

(58) Field of Classification Search
None
See application file for complete search history.

(56) References Cited

U.S. PATENT DOCUMENTS

2014/0056278 A1\* 2/2014 Marinier ............. H04W 52/367
370/330
2015/0230234 A1\* 8/2015 Choi ................... H04B 7/0417
370/329

(Continued)

OTHER PUBLICATIONS

Office Action to the corresponding Taiwan Patent Application rendered by the Taiwan Intellectual Property Office (TIPO) dated Apr. 26, 2021, 62 pages (including English translation).

(Continued)

*Primary Examiner* — Clemence S Han
(74) *Attorney, Agent, or Firm* — Skaar Ulbrich Macari, P.A.

(57) ABSTRACT

A base station and user equipment with prioritized transmission considerations are provided. The base station generates an RRC configuration message for a user equipment. The RRC configuration message includes a first information element regarding a PHY layer, wherein the first information element is related to a DCI format for a specific indication, and the specific indication is related to a prioritized transmission mode. The RRC configuration message further includes a second information element regarding a MAC layer, wherein the second information element defines a transmission restriction of each of a plurality of logical channels, and at least one of the transmission restrictions corresponds to the prioritized transmission mode. The base station further transmits the RRC configuration message to the user equipment. The user equipment receives the RRC configuration message from the base station and reads the first information element and the second information element from the RRC configuration message.

24 Claims, 8 Drawing Sheets

(51) Int. Cl.
  *H04W 72/10* (2009.01)
  *H04W 76/27* (2018.01)
  *H04W 72/04* (2009.01)

(56) References Cited

U.S. PATENT DOCUMENTS

| | | | |
|---|---|---|---|
| 2017/0099656 A1* | 4/2017 | Seo | H04L 5/0048 |
| 2017/0279583 A1* | 9/2017 | Dinan | H04L 1/0026 |
| 2017/0290040 A1* | 10/2017 | Dinan | H04L 27/0006 |
| 2017/0310433 A1* | 10/2017 | Dinan | H04L 27/2613 |
| 2017/0310531 A1* | 10/2017 | Dinan | H04L 27/32 |
| 2017/0318594 A1* | 11/2017 | Babaei | H04W 72/087 |
| 2017/0318595 A1* | 11/2017 | Dinan | H04L 5/0053 |
| 2017/0359808 A1* | 12/2017 | Dinan | H04L 5/0053 |
| 2018/0227805 A1* | 8/2018 | Jang | H04W 28/26 |
| 2018/0262302 A1* | 9/2018 | Bergstrom | H04L 1/1812 |
| 2018/0279327 A1* | 9/2018 | Ying | H04W 72/0446 |
| 2018/0368132 A1* | 12/2018 | Babaei | H04L 1/1819 |
| 2019/0089498 A1* | 3/2019 | Pelletier | H04L 5/003 |
| 2019/0200351 A1* | 6/2019 | Sun | H04W 72/0446 |
| 2019/0349116 A1* | 11/2019 | Hosseini | H04L 1/0003 |
| 2020/0228190 A1* | 7/2020 | Cirik | H04L 5/10 |
| 2020/0267764 A1* | 8/2020 | Rastegardoost | H04W 74/0833 |
| 2020/0396759 A1* | 12/2020 | Baldemair | H04B 7/0413 |
| 2020/0396760 A1* | 12/2020 | Yi | H04W 72/042 |
| 2021/0100061 A1* | 4/2021 | Park | H04W 28/0268 |
| 2021/0144580 A1* | 5/2021 | Alfarhan | H04W 80/02 |

OTHER PUBLICATIONS

3GPP TS 38.331 V15.6.0; Technical Specification Group Radio Access Network; NR; Radio Resource Control (RRC) protocol specification (Release 15); Jun. 29, 2019; 517 pages.

3GPP TS 38.306 V15.6.0; Technical Specification Group Radio Access Network; NR; User Equipment (UE) radio access capabilities (Release 15); Jun. 29, 2019; 46 pages.

* cited by examiner

BASE STATION AND USER EQUIPMENT WITH PRIORITIZED TRANSMISSION CONSIDERATIONS

PRIORITY

This application claims priority to U.S. Provisional Patent Application No. 62/889,050 filed on Aug. 20, 2019, which is hereby incorporated by reference in its entirety.

FIELD

The present invention relates to a base station and a user equipment. More specifically, the present invention relates to a base station and a user equipment with prioritized transmission considerations.

BACKGROUND

According to the current specification of the fifth generation of mobile communication technology (5G), the core network establishes at least one Packet Data Unit (PDU) session for each user equipment and the Next Generation Radio Access Network (NG-RAN) establishes at least one Data Radio Bearer (DRB) together with each PDU session. Within one PDU session, each Quality of Service (QoS) flow is identified by a QoS Flow ID (QFI). Due to the fact that the applications provided by 5G are quite diverse but the radio resources are limited, the maximum number of DRBs that can exist within one PDU session is 32 and the maximum number of QoS flows that can exist within one PDU session is 256. Therefore, it is often the case that several QoS flows are mapped to one DRB. The Service Data Adaptation Protocol (SDAP) layer of the base station (the base station may be referred to as a gNodeB or gNB according to the current specification of 5G) is in charge of the mapping between the QoS flows and the DRBs.

Packet Data Convergence Protocol (PDCP) duplication (also known as packet duplication) is the key to low latency and high reliability. To meet the Ultra-Reliable and Low Latency Communication (URLLC) and Time Sensitive Network (TSN) requirements, the Radio Resource Control (RRC) layer of the base station can configure up to 4 Radio Link Control (RLC) entities per DRB (i.e. up to 4 legs per DRB) for PDCP duplication according to the current specification of 5G. In other words, a packet of a service flow that requires URLLC and TSN can be duplicated to 4 copies at most. Nevertheless, the duplication efficiency will be impaired in two aspects based on the current specification of 5G.

The first aspect of the impairment of the duplication efficiency is described herein. The Medium Access Control (MAC) layer provides a plurality of logical channels for data transmission services, and each logical channel corresponds to a transmission restriction. The transmission restriction of each logical channel may comprise one or more parameters, such as a parameter indicating the allowed serving cell, a parameter indicating the maximum Physical Uplink Shared Channel (PUSCH) duration allowed for transmission, a parameter indicating whether a configured grant (Type 1) can be used for transmission, a parameter indicating the allowed subcarrier spacing for transmission (but not limited thereto). The MAC layer is in charge of scheduling the packets of the logical channels according to their transmission restrictions when there is a granted resource, and this procedure is known as Logical Channel Prioritization (LCP). However, the MAC layer has no specific information regarding whether a packet in a logical channel is related to a service requiring high reliability or not (e.g. whether a packet is a duplicated packet of a service flow requiring URLLC and TSN). As a consequence, the MAC layer may not handle a packet related to a service requiring high reliability at the first place when scheduling and, hence, the duplication efficiency is impaired.

The second aspect of the impairment of the duplication efficiency is described herein. According to the current specification of 5G, downlink pre-emption is specified for New Radio (NR) allowing the latest downlink assignment (i.e. dynamic grant) to override the previous downlink assignment (i.e. configured grant). When pre-emption occurs, the MAC layer sends an indication to the Physical (PHY) layer. The previous MAC PDU will be discarded and cannot be recovered through Hybrid Automatic Repeat request (HARQ). In some cases, the higher layer (e.g. PDCP layer) may not be aware of a transmission on the pre-empted grant if the transmission of the configured grant is completely pre-empted at the PHY layer. Due to transmission mismatch, the duplication efficiency is impaired.

Therefore, to achieve the URLLC and TSN requirements thoroughly, 5G needs a scheduling and transmission technique that has prioritized transmission considerations of the higher layer (e.g. PDCP layer) and has no impairment to the duplication efficiency.

SUMMARY

Provided is a base station. The base station may comprise a transceiving interface and a processor, wherein the processor is electrically connected to the transceiving interface. The processor is configured to generates a Radio Resource Control (RRC) configuration message for a user equipment. The RRC configuration message comprises a first information element regarding a Physical (PHY) layer, wherein the first information element is associated with a Downlink Control Information (DCI) format for a specific indication, and the specific indication is related to a prioritized transmission mode. The RRC configuration message further comprises a second information element regarding a Medium Access Control (MAC) layer, wherein the second information element defines a transmission restriction of each of a plurality of logical channels, and at least one of the transmission restrictions corresponds to the prioritized transmission mode. The transceiving interface further transmits the RRC configuration message to the user equipment.

Also provided is a user equipment. The user equipment may comprise a transceiving interface and a processor, wherein the processor is electrically connected to the transceiving interface. The transceiving interface receives an RRC configuration message from the base station. The processor reads a first information element regarding a PHY layer from the RRC configuration message, wherein the first information element is associated with a DCI format for a specific indication, and the specific indication is related to a prioritized transmission mode. The processor further reads a second information element regarding a MAC layer from the RRC configuration message, wherein the second information element defines a transmission restriction of each of a plurality of logical channels, and at least one of the transmission restrictions corresponds to the first prioritized transmission mode.

The base station and the user equipment provided by the present invention are with prioritized transmission considerations, and the prioritized transmission considerations are achieved by embedding a first information element regarding a PHY layer and a second information element regarding a MAC layer in an RRC configuration message. The first information element defines a DCI format for a specific indication, wherein the specific indication is related to a prioritized transmission mode (e.g. high reliability, preemption prohibition). The second information element defines a transmission restriction of each of a plurality of logical channels, wherein at least one of the transmission restrictions corresponds to the prioritized transmission mode. The base station transmits the RRC configuration message to the user equipment so that the user equipment learns the first information element and the second information element from the RRC configuration message.

Thereafter, the base station and the user equipment can utilize the DCI format in various ways to schedule the packets in the logical channels. As the DCI format is designated for a specific indication related to a prioritized transmission mode, the packets in the logical channels will be scheduled with prioritized transmission considerations. Therefore, the URLLC and TSN requirements can be thoroughly achieved, and duplication efficiency will not be impaired.

The detailed technology and exemplary embodiments implemented for the subject invention are described in the following paragraphs accompanying the appended drawings for a person having ordinary skill in the art to well appreciate the features of the claimed invention.

DETAILED DESCRIPTION

In the following descriptions, the base station and the user equipment provided by the present invention will be explained with reference to certain exemplary embodiments thereof. However, these exemplary embodiments are not intended to limit the present invention to any specific environment, example, embodiment, applications, or implementations described in these exemplary embodiments. Therefore, description of these exemplary embodiments is only for purpose of illustration rather than to limit the scope of the present invention.

It should be appreciated that, in the following exemplary embodiments and the attached drawings, elements unrelated to the present invention are omitted from depiction. In addition, dimensions of and dimensional scales between individual elements in the attached drawings are provided only for ease of depiction and illustration, but not to limit the scope of the present invention.

Figure 1A:
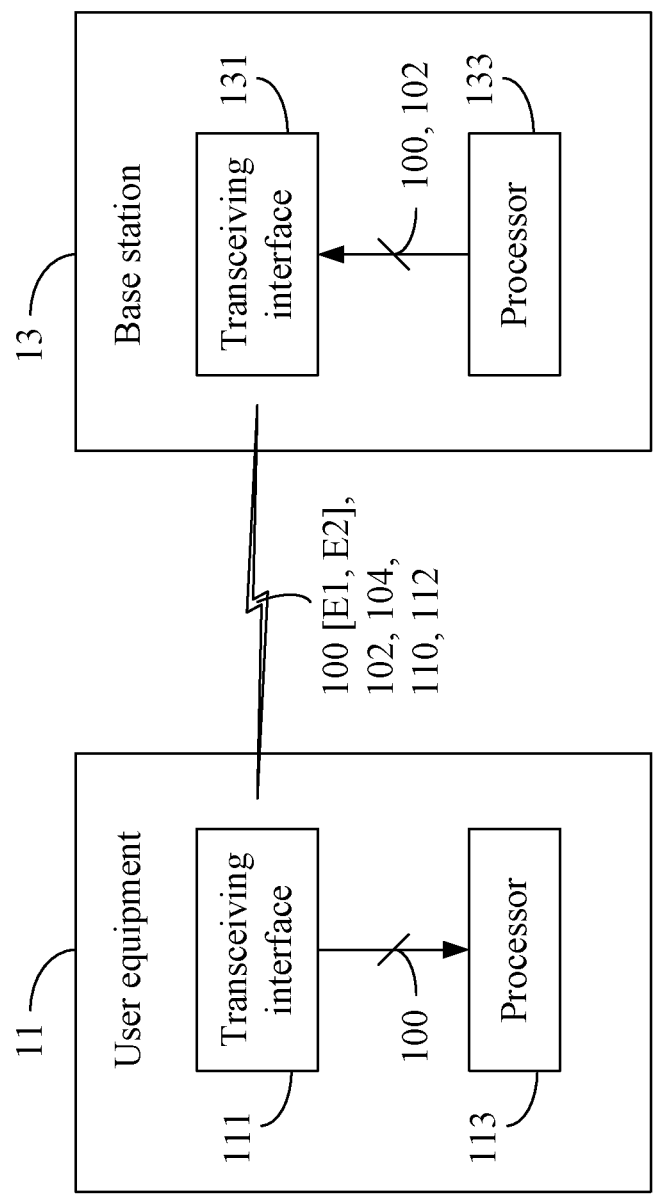
FIG. 1A illustrates a schematic view of a part of the mobile communication system of the first embodiment.

A first embodiment of the present invention is a mobile communication system and a schematic view of a part of the mobile communication system is depicted in FIG. 1A. The mobile communication system conforms to the specification of the fifth generation of mobile communication technology (5G). The mobile communication system comprises a user equipment 11 and a base station 13. Please note that a base station may be referred to as a gNodeB or gNB according to the specification of 5G.

The user equipment 11 comprises a transceiving interface 111 and a processor 113, wherein the processor 113 is electrically connected to the transceiving interface 111. The transceiving interface 111 may be any interface capable of communicating with a base station. The processor 113 may be any of various processors, central processing units (CPUs), microprocessors, or other computing apparatuses known to those of ordinary skill in the art. The base station 13 comprises a transceiving interface 131 and a processor 133, wherein the processor 133 is electrically connected to the transceiving interface 131. The transceiving interface 131 may be any interface capable of communicating with a user equipment. The processor 133 may be any of various processors, CPUs, microprocessors, or other computing apparatuses known to those of ordinary skill in the art.

Figure 1B:
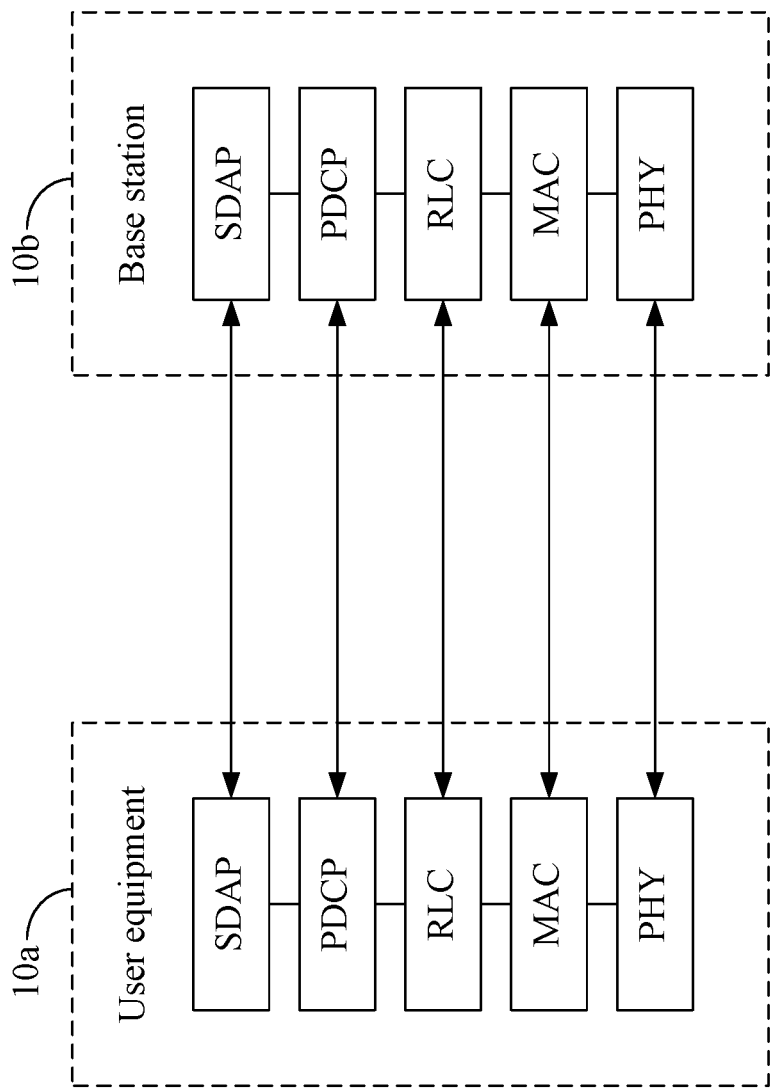
FIG. 1B illustrates the user plane protocol stacks 10a, 10b executed by the user equipment 11 and the base station 13 respectively.
Figure 1C:
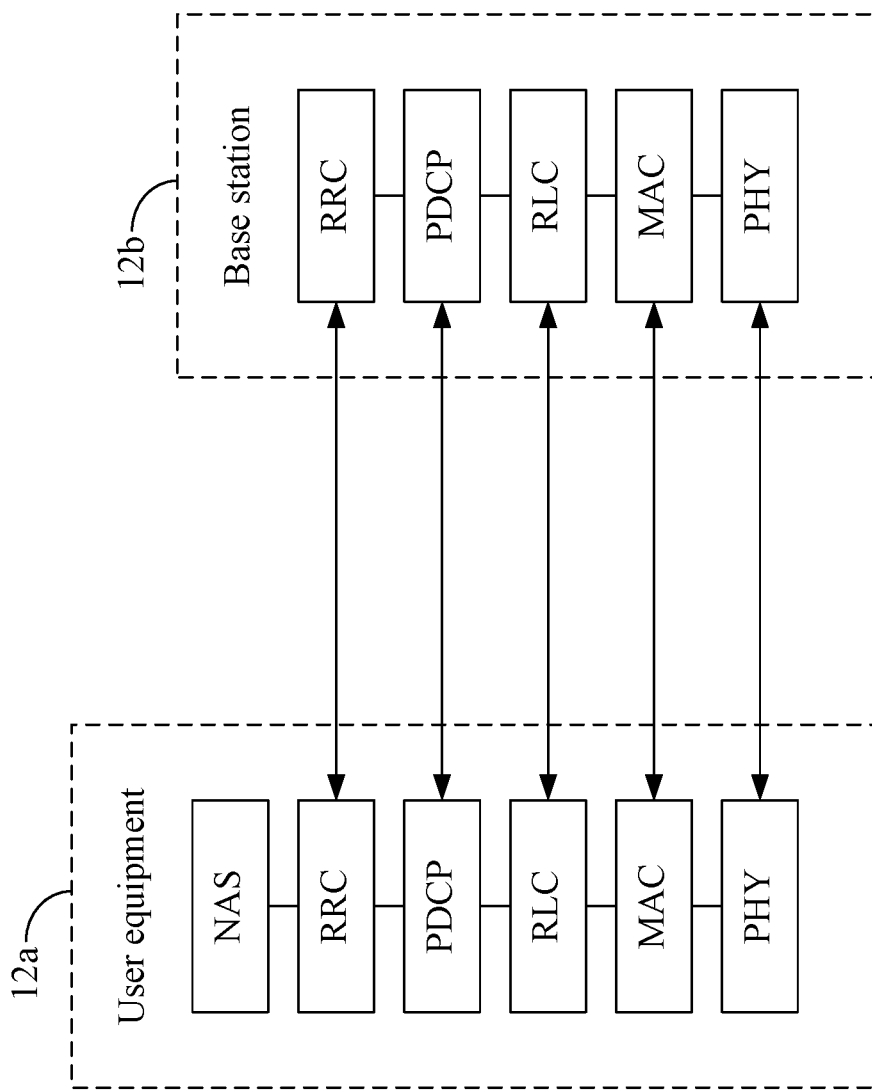
FIG. 1C illustrates the control plane protocol stacks 12a, 12b executed by the user equipment 11 and the base station 13 respectively.

FIG. 1B illustrates the user plane protocol stacks 10a, 10b executed by the user equipment 11 and the base station 13 respectively. Each of the user plane protocol stacks 10a, 10b comprises a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer from top to bottom. FIG. 1C depicts the control plane protocol stacks 12a, 12b executed by the user equipment 11 and the base station 13 respectively. The control plane protocol stacks 12a comprises a Non-Access Stratum (NAS) layer, a Radio Resource Control (RRC) layer, a PDCP layer, an RLC layer, a MAC layer, and a PHY layer from top to down, while the control plane protocol stacks 12b comprises an RRC layer, a PDCP layer, an RLC layer, a MAC layer, and a PHY layer from top to down.

It is assumed that the user equipment 11 has attached to the base station 13. The user equipment 11 has to be configured after attaching to the base station 13. In addition to the conventional configurations that have to be performed according to the 5G specification, the configuration regarding a first prioritized transmission mode (e.g. a mode for high reliability, a mode of preemption prohibition, but it is not limited thereto) has to be performed in this embodiment.

Specifically, the processor 133 of the base station 13 generates an RRC configuration message 100 comprising an information element E1 regarding the PHY layer. For example, the RRC configuration message 100 may be a UECapabilityInformation message defined in 5G specification, an RRCSetup message defined in 5G specification, an RRCReconfiguration message defined in 5G specification, and an RRCResume message defined in 5G specification, but it is not limited thereto. The information element E1 is associated with a DCI format (not shown) for a specific indication (not shown), and the specific indication is related to a first prioritized transmission mode (e.g. a mode for high reliability, a mode of preemption prohibition, but it is not limited thereto). To be more specific, the first information element E1 defines a search space of a DCI for the specific indication, and the DCI derived in the search space is related to the first prioritized transmission mode. To be distinguishable from the conventional DCI format(s) specified in the specification of 5G, the DCI format defined in the information element E1 of the RRC configuration message 100 may be referred to as "the new DCI format" in this description.

In some embodiments, only one of several transmission modes can be considered as the first prioritized transmission mode (e.g. only the high reliability mode is considered as the first prioritized transmission mode), and, in these embodiments, the new DCI format is used for indicating whether the first prioritized transmission mode is activated. Yet, in some embodiments, multiple transmission modes may be considered as the first prioritized transmission modes (e.g. both the high reliability mode and the preemption prohibition mode are considered as the first prioritized transmission modes), and, in those embodiments, the new DCI format is used for distinguishing these first prioritized transmission modes (i.e. designating one from the first prioritized transmission modes).

The MAC layer provides a plurality of logical channels (not shown) for data transmission services. The RRC configuration message 100 further comprises an information element E2 regarding the MAC layer, wherein the information element E2 defines a transmission restriction of each of the logical channels, and at least one of the transmission restrictions of the logical channels corresponds to the first prioritized transmission mode. For example, the transmission restriction of each logical channel may comprise one or more parameters, such as a parameter for indicating that the logical channel is for the first prioritized transmission mode (or a parameter for indicating that the logical channel is for which first prioritized transmission mode), a parameter indicating the allowed serving cell, a parameter indicating the maximum Physical Uplink Shared Channel (PUSCH) duration allowed for transmission, a parameter indicating whether a configured grant (Type 1) can be used for transmission, a parameter indicating the allowed subcarrier spacing for transmission (but not limited thereto).

After the generation of the RRC configuration message 100, the transceiving interface 131 of the base station 13 transmits the RRC configuration message 100 to the user equipment 11. At the user equipment 11, the transceiving interface 111 receives the RRC configuration message 100 from the base station 13. The processor 113 of the user equipment 11 reads the information element E1 regarding the PHY layer from the RRC configuration message 100 and, hence, learns the new DCI format can be used for the specific indication (i.e. can be used to indicate the first prioritized transmission). In addition, the processor 113 reads the information element E2 regarding the MAC layer from the RRC configuration message 100 and thereby learn the transmission restriction of each of the logical channels.

With the transmission of the RRC configuration message 100, both the user equipment 11 and the base station 13 have the knowledge that the new DCI format can be used for the specific indication related to the first prioritized transmission mode as well as the transmission restriction of each of the logical channels. Since at least one of the logical channels has the transmission restriction corresponding to the first prioritized transmission mode, at least one of the logical channels in the MAC layer is reserved for the first prioritized transmission mode.

Herein, it is assumed that the base station 13 has granted the user equipment 11 a resource in the PHY layer for the first prioritized transmission mode. The processor 133 of the base station 13 generates a DCI 102 having the new DCI format for indicating where the granted resource is as well as for indicating that the granted resource is for first prioritized transmission mode. For example, for the scenario that only one of several transmission modes is considered as the first prioritized transmission mode, the DCI 102 indicates that the first prioritized transmission mode is activated. As another example, for the scenario that multiple transmission modes are considered as the first prioritized transmission modes, the DCI 102 indicates a certain one of the first prioritized transmission modes. Then, the transceiving interface 131 of the base station 13 transmits the DCI 102 to the user equipment 11.

At the user equipment 11, the transceiving interface 111 receives the DCI 102 and the processor 113 learns that the granted resource indicated by the DCI 102 is for the first prioritized transmission mode. In response to the DCI 102, the processor 113 of the user equipment 11 arranges a packet 104 from the logical channel having the transmission restriction corresponding to the first prioritized transmission mode to the granted resource. Then, the transceiving interface 111 of the user equipment 11 transmits the packet 104 on the granted resource to the base station 13. At the base station 13, the transceiving interface 131 receives the packet 104 from the user equipment 11.

According to the above descriptions, a new DCI format is defined for the specific indication related to the first prioritized transmission mode, and at least one of the logical channels in the MAC layer has the transmission restriction corresponding to the first prioritized transmission mode. Thus, at least one of the logical channels in the MAC layer may be reserved for the first prioritized transmission mode. When there is a granted resource for the first prioritized transmission mode, the base station 13 can inform the user equipment 11 by sending a DCI having the new DCI format. In this way, the user equipment 11 can arrange a packet from the logical channel having the transmission restriction corresponding to the first prioritized transmission mode to the granted resource.

By the aforementioned mechanism, the user equipment 11 is able to schedule the packets in the logical channels with prioritized transmission considerations (e.g. consideration of high reliability of higher layers, consideration of preemption prohibition, but it is not limited thereto). Therefore, the Ultra-Reliable and Low Latency Communication (URLLC) and Time Sensitive Network (TSN) requirements can be thoroughly achieved, and duplication efficiency will not be impaired.

Figure 2:
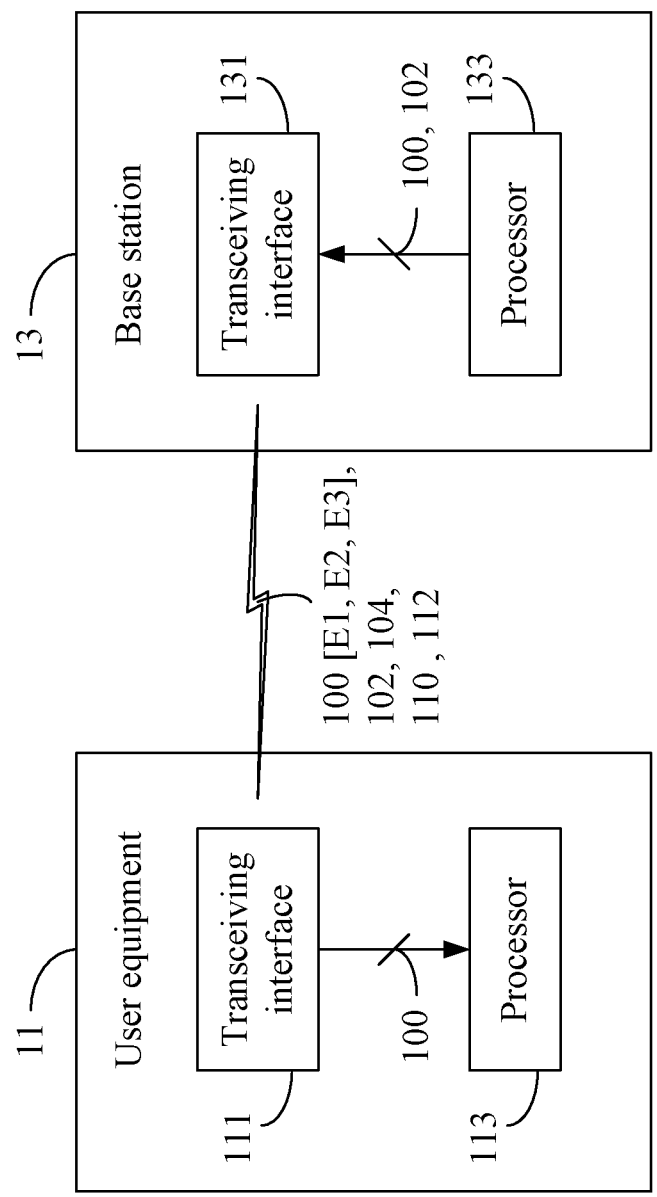
FIG. 2 illustrates a schematic view of a part of the mobile communication system of the second embodiment.

Please refer to FIG. 1B, FIG. 1C, and FIG. 2 for a second embodiment of the present invention. The second embodiment is similar to the first embodiment and, hence, only the differences therebetween are detailed in the following descriptions.

In this embodiment, the RRC configuration message 100 generated by the processor 133 of the base station 13 comprises not only the information elements E1 and E2 as described in the first embodiment but also an information element E3 regarding the PHY layer or the MAC layer. It is noted that the information element E3 records a prioritization threshold. Since the RRC configuration message 100 comprises the additional information element E3, the processor 113 of the user equipment 11 will read the information element E3 from the RRC configuration message 100 and learn about the prioritization threshold.

Herein, it is assumed that the base station 13 has granted the user equipment 11 a resource in the PHY layer for the first prioritized transmission mode. Similar to the first embodiment, the processor 133 of the base station 13 generates a DCI 102 having the new DCI format for indicating where the granted resource is as well as for indicating that the granted resource is for first prioritized transmission mode, and the transceiving interface 131 of the base station 13 transmits the DCI 102 to the user equipment 11.

At the user equipment 11, the transceiving interface 111 receives the DCI 102 and learns that there is a granted resource. In this embodiment, after receiving the DCI 102, the processor 113 of the user equipment 11 calculates a prioritization weight for each of the logical channels according to the corresponding transmission restriction.

As mentioned, the transmission restriction of each logical channel may comprise one or more parameters (e.g. a parameter for indicating that the logical channel is for the first prioritized transmission mode, a parameter for indicating that the logical channel is for which first prioritized transmission mode, a parameter indicating the allowed serving cell, a parameter indicating the maximum PUSCH duration allowed for transmission, a parameter indicating whether a configured grant (Type 1) can be used for transmission, a parameter indicating the allowed subcarrier spacing for transmission). Therefore, for each of the logical channels, the processor 113 may calculate the prioritization weight according to the parameter(s) comprised in the transmission restriction. For example, the processor 113 may map the content of each of the parameters to a value individually, give different weights to the values, and sum up the weighted values as the prioritization weight.

In this embodiment, if the prioritization weight of a logical channel is greater than the prioritization threshold, it means that the packets in the logical channel correspond to the first prioritized transmission mode. Hence, the processor 113 of the user equipment 11 arranges a packet 104 from the logical channel having the prioritization weight greater than the prioritization threshold to the granted resource indicated by the DCI 102. The transceiving interface 111 of the user equipment 11 then transmits the packet 104 on the granted resource. At the base station 13, the transceiving interface 131 receives the packet 104 from the user equipment 11.

Yet, in some other embodiments, a prioritization weight may be calculated per packet instead of per logical channel. For those embodiments, a plurality of packets are in the logical channels, each of the packets is of a packet size, and the processor 113 of the user equipment 11 will calculate a prioritization weight for each of the packets in the logical channels according to the corresponding transmission restriction and the corresponding packet size. If the prioritization weight of a packet is greater than the prioritization threshold, that packet will be considered as corresponding to the first prioritized transmission mode. Then, the processor 113 of the user equipment 11 will arrange the packet having the prioritization weight greater than the prioritization threshold to the granted resource indicated by the DCI 102 and the transceiving interface 111 of the user equipment 11 will transmit the packet being arranged on the granted resource.

According to the above descriptions, a prioritization threshold may be configured by the present invention. When there is a granted resource for the first prioritized transmission mode, the user equipment 11 may calculate a prioritization weight for each of the logical channels according to the corresponding transmission restriction. If the prioritization weight of a logical channel is greater than the prioritization threshold (meaning that the packets in the logical channel correspond to the first prioritized transmission mode), the user equipment 11 will arrange a packet 104 from that logical channel to the granted resource. The calculation of the prioritization weight may be packet-wised as well. By configuring the prioritization threshold and calculating the prioritization weights, the user equipment 11 is able to schedule the packets in the logical channels with prioritized transmission considerations (e.g. consideration of high reliability of higher layers, consideration of preemption prohibition, but it is not limited thereto). Therefore, the URLLC and TSN requirements can be thoroughly achieved, and duplication efficiency will not be impaired.

Figure 3:
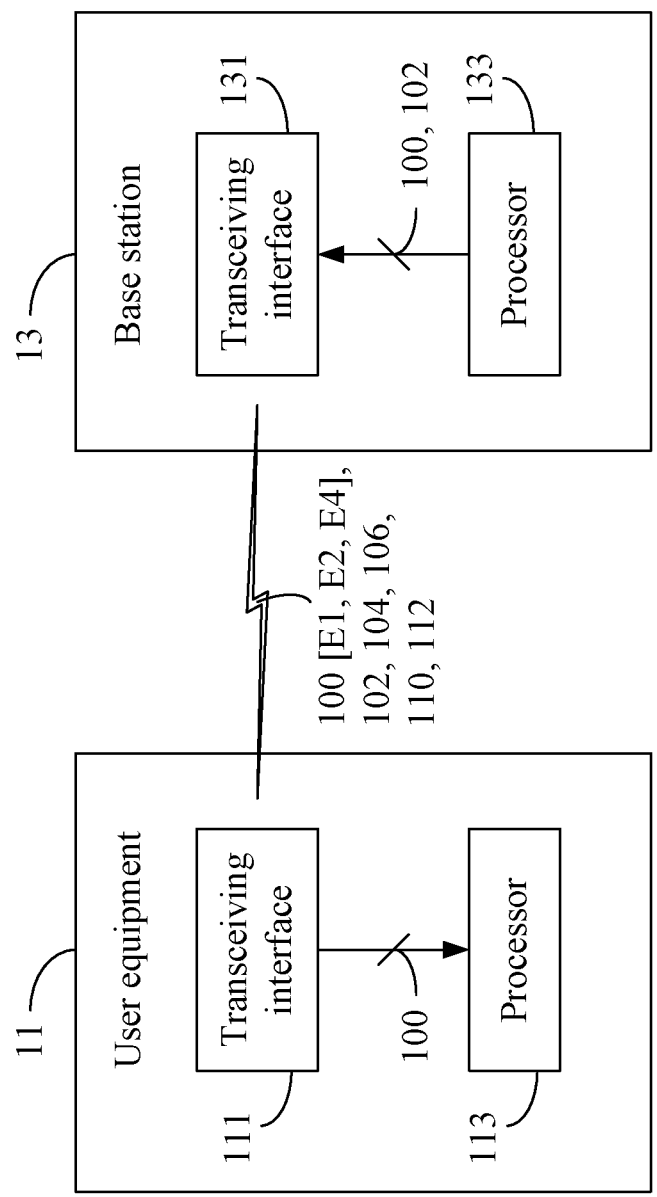
FIG. 3 illustrates a schematic view of a part of the mobile communication system of the third and fourth embodiments.

Please refer to FIG. 1B, FIG. 1C, and FIG. 3 for a third embodiment of the present invention. The third embodiment is similar to the first embodiment but further provides prioritized transmission considerations from the PDCP layer. In the following descriptions, only the differences between the first embodiment and the third embodiment are detailed.

It is assumed that the user equipment 11 has attached to the base station 13. The core network establishes a plurality of Packet Data Unit (PDU) sessions for the user equipment 11, while the Next Generation Radio Access Network (NG-RAN) establishes a plurality of Data Radio Bearers (DRBs) together with each of the PDU sessions. Each PDU session is mapped to one of a plurality of the PDCP entities at the PDCP layer. The SDAP layer of the base station 13 is in charge of the mapping between the QoS flows and the DRBs, which is complicated due to the fact that each QoS flow is formed by several PDU sessions and a PDU session corresponds to several DRBs.

To provide prioritized transmission considerations, a prioritized PDCP entity in addition to the aforesaid conventional PDCP entities is defined, one of the DRBs is assigned to be associated with the prioritized PDCP entity uniquely, and one of the logical channels of the MAC layer is assigned to be dedicated for the DRB associated with the prioritized PDCP entity in this embodiment. The details are described below.

In this embodiment, the processor 133 of the base station 13 further generates a prioritized PDCP entity (not shown) at the PDCP layer in addition to the aforesaid conventional PDCP entities. The prioritized PDCP entity has the first prioritized transmission mode (e.g. a mode for high reliability, a mode of preemption prohibition, but it is not limited thereto), which means that the prioritized PDCP entity is dedicated for the QoS flows corresponding to the first prioritized transmission mode. The processor 133 of the base station 13 assigns one of the DRBs to be associated with the prioritized PDCP entity uniquely.

In this embodiment, the RRC configuration message 100 generated by the processor 133 of the base station 13 comprises not only the information elements E1 and E2 as described in the first embodiment but also an information element E4 regarding the PDCP layer. The information element E4 defines that one of the logical channels is dedicated for the DRB that is associated with the prioritized PDCP entity. Since the RRC configuration message 100 comprises the additional information element E4, the processor 113 of the user equipment 11 will read the information element E4 from the RRC configuration message 100 and learn that one of the logical channels is dedicated for the DRB associated with the prioritized PDCP entity. Herein, it is assumed that the base station 13 has granted the user equipment 11 a resource in the PHY layer for the first prioritized transmission mode. Similar to the first embodiment, the processor 133 of the base station 13 generates a DCI 102 having the new DCI format for indicating where the granted resource is as well as for indicating that the granted resource is for first prioritized transmission mode, and the transceiving interface 131 of the base station 13 transmits the DCI 102 to the user equipment 11.

At the user equipment 11, the transceiving interface 111 receives the DCI 102 and learns that there is a granted resource for first prioritized transmission mode. Then, the processor 113 of the user equipment 11 selects a packet 104 from the logical channel that is dedicated for the DRB that is associated with the prioritized PDCP entity and arranges the packet 104 to the granted resource indicated by the DCI 102. The transceiving interface 111 then transmits the packet 104 on the granted resource. At the base station 13, the transceiving interface 131 receives the packet 104 from the user equipment 11.

With the aforesaid arrangements (i.e. defining a prioritized PDCP entity in addition to the conventional PDCP entities, assigning one of the DRBs to be associated with the prioritized PDCP entity uniquely, and assigning one of the logical channels to be dedicated for the DRB that is associated with the prioritized PDCP entity), an SDAP entity can map a QoS flow that requires the first prioritized transmission mode to the prioritized PDCP entity. In this way, it is guaranteed that the packets of the QoS flow that requires the first prioritized transmission mode will be scheduled in the MAC layer. Therefore, the URLLC and TSN requirements can be thoroughly achieved, and duplication efficiency will not be impaired.

Please also refer to FIG. 3 for a fourth embodiment of the present invention, which is an extension of the third embodiment. In the following descriptions, only the differences therebetween are detailed.

According to the specification of 5G, it is possible that several QoS flows will be mapped to one DRB because the number of DRBs and the number of QoS flow that can exist within one PDU session can be up to 32 and 256 respectively. If several QoS flows are mapped to the DRB that is uniquely associated for the prioritized PDCP entity, it is possible that some of these QoS flows are not of the first prioritized transmission mode. Therefore, in this embodiment, it is suggested that the first prioritized transmission mode of the prioritized PDCP entity be relaxed sometimes. In other words, it is suggested that the first prioritized transmission mode of the prioritized PDCP entity and the corresponding DRB and logical channel may be activated or deactivated. The details are described below.

In this embodiment, the processor 133 of the base station 13 further configures a piece of MAC information 106 for indicating whether the first prioritized transmission mode of the prioritized PDCP entity is activated or not. For example, the piece of MAC information 106 may be a MAC indicator for informing the PHY layer that the first prioritized transmission mode is on or off. As another example, the piece of MAC information 106 may be a MAC control element for informing the higher layers (e.g. the SDAP layer, the PDCP layer, and the RLC layer) that the first prioritized transmission mode of the prioritized PDCP entity is activated or deactivated. Yet in another example, the piece of MAC information 106 may be a MAC timer for setting the time that the first prioritized transmission mode is activated. The transceiving interface 131 transmits the piece of MAC information 106 to the user equipment 11. At the user equipment 11, the transceiving interface 111 further receives the piece of MAC information 106 from the base station 13 and learns that the first prioritized transmission mode is activated.

According to the above descriptions, the first prioritized transmission mode of the prioritized PDCP entity and the corresponding DRB and logical channel may be activated or deactivated by configuring and transmitting the MAC information 106. Thereby, in addition to the advantages mentioned in the third embodiment, resources can be utilized more flexibly.

Figure 4:
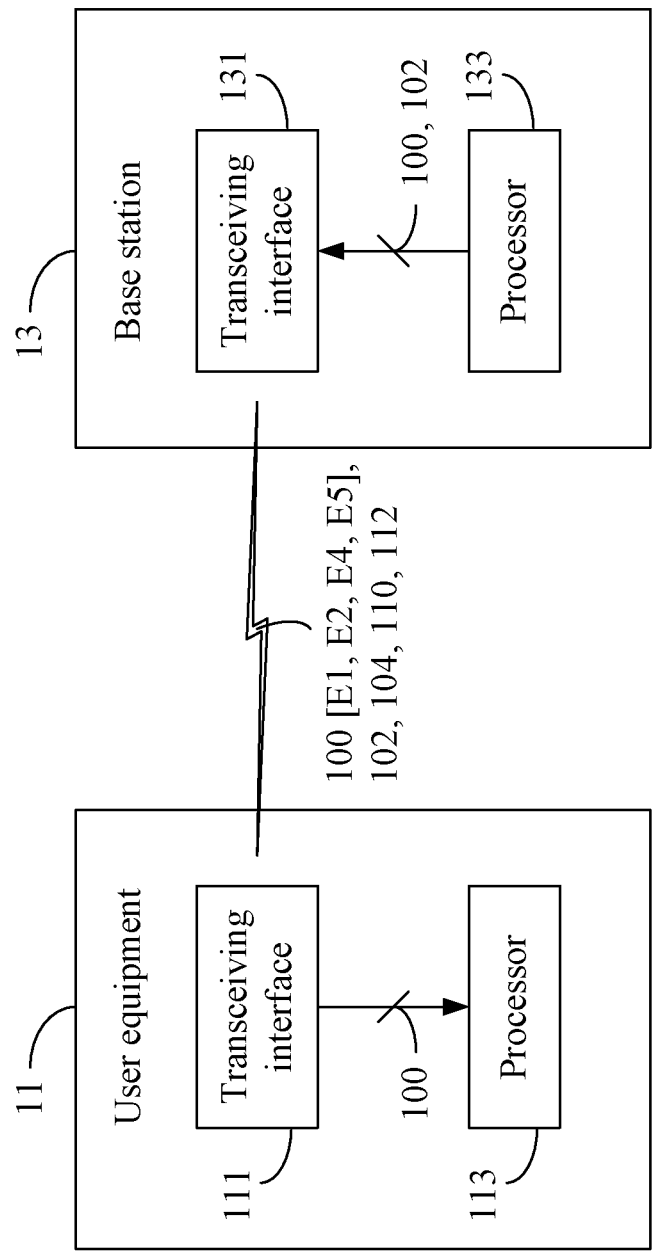
FIG. 4 illustrates a schematic view of a part of the mobile communication system of the fifth embodiment.

Please refer to FIG. 1B, FIG. 1C, and FIG. 4 for a fifth embodiment of the present invention, which is an extension of the third embodiment. In the following descriptions, only the differences therebetween are detailed.

As mentioned above, it is possible that several QoS flows will be mapped to one DRB according to the specification of 5G. If several QoS flows are mapped to the DRB that is uniquely associated for the prioritized PDCP entity, it is possible that some of these QoS flows are not of the first prioritized transmission mode. Therefore, in this embodiment, it is suggested that the first prioritized transmission mode of the prioritized PDCP entity be relaxed sometimes. The details are described below.

In this embodiment, the RRC configuration message 100 generated by the processor 133 of the base station 13 comprises not only the information elements E1, E2, E4 as described in the previous embodiments but also an information element E5 for indicating that a token (not shown) associated with the prioritized PDCP entity is activated. Since the RRC configuration message 100 comprises the additional information element E5, the processor 113 of the user equipment 11 will read the information element E5 from the RRC configuration message 100 and learn that a token associated with the prioritized PDCP entity is activated.

In some other embodiments, the information that a token associated with the prioritized PDCP entity is activated may be indicated in the information element E4 instead of being indicated in the information element E5 and, thus, the information element E5 will be omitted. In some other embodiments, whether activating a token associated with the prioritized PDCP entity is solely dependent on the user equipment 11, and, therefore, the aforesaid information element E5 will be omitted.

Herein, it is assumed that the base station 13 has granted the user equipment 11 a resource in the PHY layer for the first prioritized transmission mode. Similar to the third embodiment, the processor 133 of the base station 13 generates a DCI 102 having the new DCI format for indicating where the granted resource is as well as for indicating that the granted resource is for first prioritized transmission mode, and the transceiving interface 131 of the base station 13 transmits the DCI 102 to the user equipment 11.

At the user equipment 11, the transceiving interface 111 receives the DCI 102 and learns that there is a granted resource for first prioritized transmission mode. At the user equipment 11, the RLC layer may transmit a token to the MAC layer. In response to the receipt of the token at the MAC layer, the processor 113 of the user equipment 11 selects a packet 104 from the logical channel that is dedicated for the DRB that is associated with the prioritized PDCP entity and arranges the packet 104 to the granted resource indicated by the DCI 102. The transceiving interface 111 then transmits the packet 104 on the granted resource. At the base station 13, the transceiving interface 131 receives the packet 104 from the user equipment 11.

In this embodiment, only when the MAC layer of the user equipment 11 receives a token from the upper RLC layer will the user equipment 11 arrange a packet from the logical channel that is dedicated for the DRB associated with the prioritized PDCP entity to use a granted resource of the first prioritized transmission mode. Thereby, in addition to the advantages mentioned in the third embodiment, resources can be utilized more flexibly.

Figure 5:
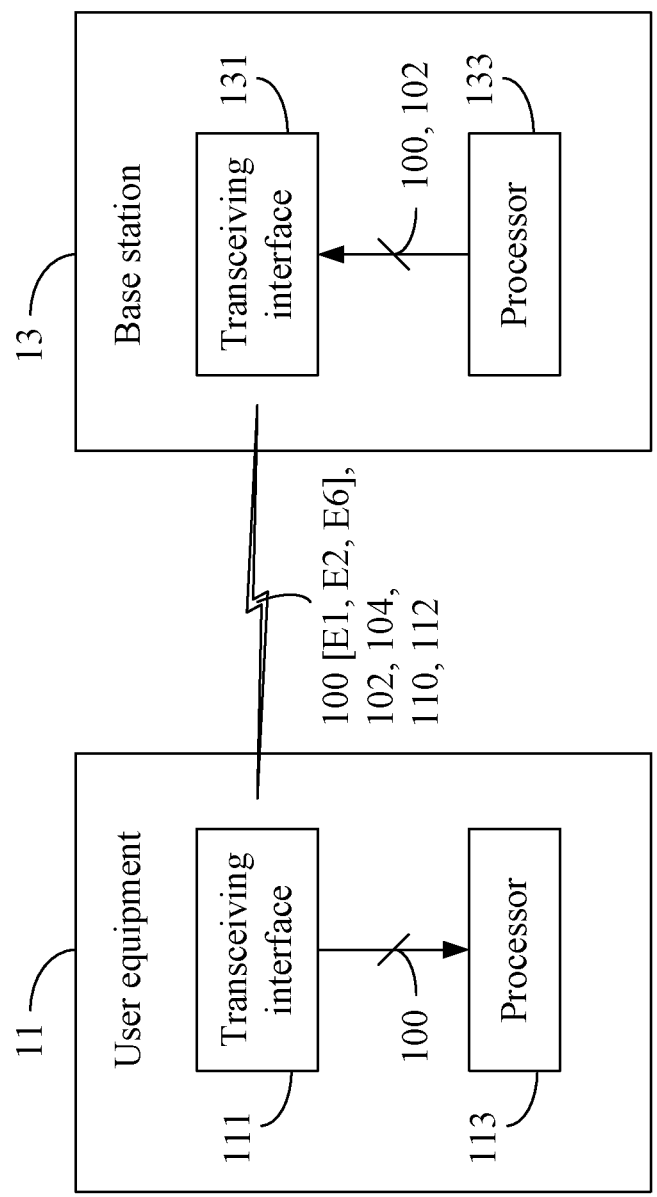
FIG. 5 illustrates a schematic view of a part of the mobile communication system of the sixth embodiment.

Please refer to FIG. 1B, FIG. 1C, and FIG. 5 for a sixth embodiment of the present invention. The sixth embodiment is similar to the first embodiment but further provides prioritized transmission considerations from the viewpoint of DRB. In the following descriptions, only the differences between the first embodiment and the sixth embodiment are detailed.

It is assumed that the user equipment 11 has attached to the base station 13. The core network establishes a plurality of PDU sessions for the user equipment 11, while the NG-RAN establishes a plurality of DRBs together with each of the PDU sessions. Each PDU session is mapped to one of a plurality of the PDCP entities at the PDCP layer. The SDAP layer of the base station 13 is in charge of the mapping between the QoS flows and the DRBs, which is complicated due to the fact that each QoS flow is formed by several PDU sessions and a PDU session corresponds to several DRBs.

To provide prioritized transmission considerations, one of the DRBs is selected as a prioritized DRB and one of the logical channels of the MAC layer is assigned to be dedicated for the prioritized DRB in this embodiment. The details are described below.

In this embodiment, the RRC configuration message 100 generated by the processor 133 of the base station 13 comprises not only the information elements E1 and E2 as described in the first embodiment but also an information element E6. The information element E6 defines that one of the DRBs is a prioritized DRB, wherein the prioritized DRB corresponds to the first prioritized transmission mode. The information element E6 further defines that one of the logical channels is dedicated for the prioritized DRB. Since the RRC configuration message 100 comprises the additional information element E6, the processor 113 of the user equipment 11 will read the information element E6 from the RRC configuration message 100 and learn that one of the DRBs is the prioritized DRB for the first prioritized transmission mode and one of the logical channels is dedicated for the prioritized DRB. In some other embodiments, the aforesaid prioritized DRB may be predefined in a 5G QoS Identifier (5QI) table and, thus, the definition regarding the prioritized DRB may be omitted from the information element E6.

Herein, it is assumed that the base station 13 has granted the user equipment 11 a resource in the PHY layer for the first prioritized transmission mode. Similar to the first embodiment, the processor 133 of the base station 13 generates a DCI 102 having the new DCI format for indicating where the granted resource is as well as for indicating that the granted resource is for first prioritized transmission mode, and the transceiving interface 131 of the base station 13 transmits the DCI 102 to the user equipment 11.

At the user equipment 11, the transceiving interface 111 receives the DCI 102 and learns that there is a granted resource for first prioritized transmission mode. Then, the processor 113 of the user equipment 11 arranges a packet 104 from the logical channel dedicated for the prioritized DRB to the granted resource indicated by the DCI. The transceiving interface 111 then transmits the packet 104 on the granted resource. At the base station 13, the transceiving interface 131 receives the packet 104 from the user equipment 11.

With the aforesaid arrangements (i.e. assigning one of the DRBs as the prioritized DRB and assigning one of the logical channels to be dedicated for the prioritized DRB), an SDAP entity can map a QoS flow that requires the first prioritized transmission mode to the prioritized DRB. In this way, it is guaranteed that the packets of the QoS flow that requires the first prioritized transmission mode will be scheduled in the MAC layer. Therefore, the URLLC and TSN requirements can be thoroughly achieved, and duplication efficiency will not be impaired.

Figure 6:
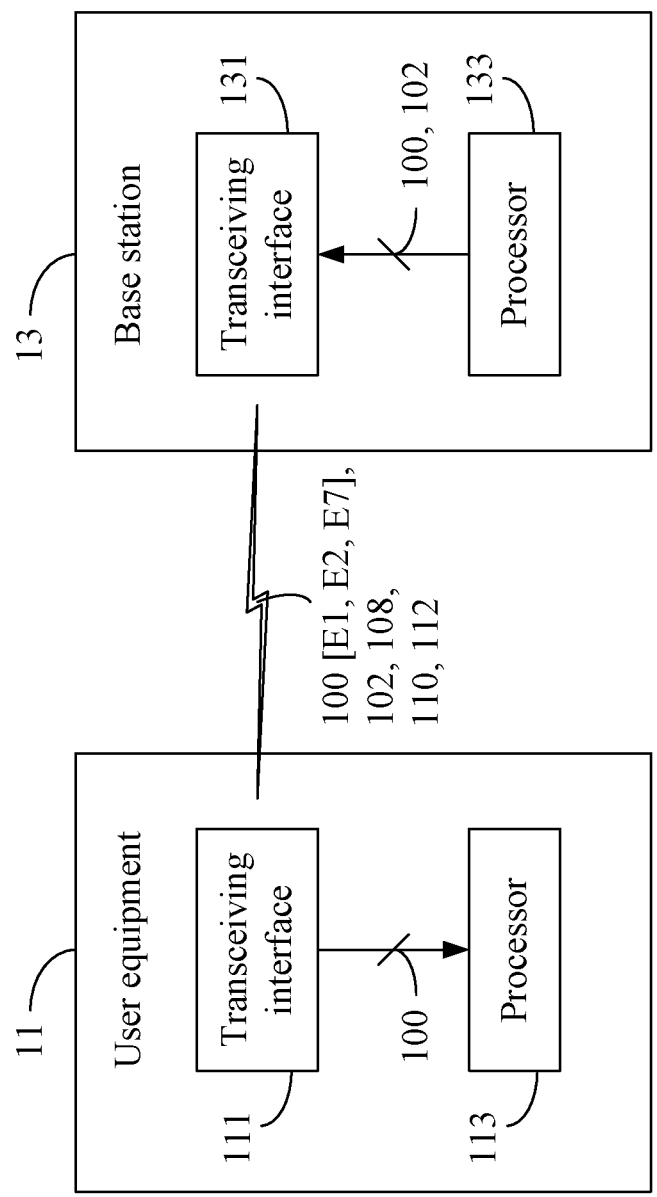
FIG. 6 illustrates a schematic view of a part of the mobile communication system of the seventh embodiment.

Please refer to FIG. 1B, FIG. 1C, and FIG. 6 for a seventh embodiment of the present invention. The seventh embodiment is similar to the first embodiment but further adds end marks to a packet that corresponds to the first prioritized transmission mode (e.g. a packet of the QoS flow corresponding to the first prioritized transmission mode). In the following descriptions, only the differences between the first embodiment and the seventh embodiment are detailed.

In this embodiment, the RRC configuration message 100 generated by the processor 133 of the base station 13 comprises not only the information elements E1 and E2 as described in the first embodiment but also an information element E7 regarding the PDCP layer. It is noted that the information element E7 indicates that an end mark usage corresponding to the first prioritized transmission mode is activated. Since the RRC configuration message 100 comprises the additional information element E7, the processor 113 of the user equipment 11 will read the information element E7 from the RRC configuration message 100 and learn that the end mark usage corresponding to the first prioritized transmission mode is activated. In some other embodiments, whether activating an end mark usage corresponding to the first prioritized transmission mode is solely dependent on the user equipment 11, and, therefore, the aforesaid information element E7 will be omitted.

As the first prioritized transmission mode is activated, the PDCP entity (executed by the processor 113) of the user equipment 11 will add an end mark to a packet that corresponds to the first prioritized transmission mode and transmit the packet that has been added the end mark to the MAC layer.

Herein, it is assumed that the base station 13 has granted the user equipment 11 a resource in the PHY layer for the first prioritized transmission mode. Similar to the first embodiment, the processor 133 of the base station 13 generates a DCI 102 having the new DCI format for indicating where the granted resource is as well as for indicating that the granted resource is for first prioritized transmission mode, and the transceiving interface 131 of the base station 13 transmits the DCI 102 to the user equipment 11.

At the user equipment 11, the transceiving interface 111 receives the DCI 102 and learns that there is a granted resource. Then, the processor 113 of the user equipment 11 arranges a packet 108 that have the end mark from any of the logical channels, and the transceiving interface 111 of the user equipment 11 transmits the packet 108 on the granted resource. At the base station 13, the transceiving interface 131 receives the packet 108 from the user equipment 11.

With the aforesaid arrangements (i.e. activating the end mark usage corresponding to the first prioritized transmission mode and adding a plurality of end marks to a packet that corresponds to the first prioritized transmission mode), it is guaranteed that the packets of the QoS flow that requires the first prioritized transmission mode will be scheduled in the MAC layer. Therefore, the URLLC and TSN requirements can be thoroughly achieved, and duplication efficiency will not be impaired.

In any of the above first to seventh embodiments, the activation of the first prioritized transmission mode may be activated by the user equipment 11. To be more specific, the transceiving interface 111 of the user equipment 11 may transmit a prioritization establishment cause 110 to the base station 13 for indicating that the first prioritized transmission mode is required. At the base station 13, the transceiving interface 131 receives the prioritization establishment cause 110 from the user equipment 11, and the processor 133 configures the information elements E1, E2 in response to the prioritization establishment cause 110. By transmitting the prioritization establishment cause 110 to the base station 13, the first prioritized transmission mode is activated by the user equipment 11.

In any of the above first to seventh embodiments, two prioritized transmission modes may be defined, including the aforesaid first prioritized transmission mode and a second prioritized transmission mode. When two prioritized transmission modes are defined, the first prioritized transmission mode is superior to the second prioritized transmission mode (i.e. the first prioritized transmission mode corresponds to higher reliability than the second prioritized transmission mode does).

Specifically, the base station 13 may determine whether it is necessary to reserve radio resources for the second prioritized transmission mode. For example, when the MAC buffer of the base station 13 is busy, it is suggested to reserve radio resources for the second prioritized transmission mode. If the base station 13 determines to reserve radio resources for the second prioritized transmission mode, the transceiving interface 131 broadcasts a system information 112 indicating that the second prioritized transmission mode is activated within a predetermined time period. At the user equipment 11, the transceiving interface 111 receives the system information 112 and learns that the second prioritized transmission mode is activated within the predetermined time period. It means that the granted resource within this predetermined time period is guaranteed corresponding to the second prioritized transmission mode. If higher reliability is required, any of the above first to seventh embodiments may be further executed.

In some cases, the transceiving interface 131 of the base station 13 may regularly broadcast a system information indicating that the second prioritized transmission mode is activated within a predetermined time period. Yet, in some cases, the system information may be initiated by the user equipment 11. That is, if the user equipment 11 requires a high reliability connection (e.g. URLLC connection), the transceiving interface 111 of the user equipment 11 may transmit a request for system information to the base station 13. In response to the request for system information, the transceiving interface 131 of the base station 13 will transmit the aforesaid system information to the user equipment 11 or broadcast the aforesaid system information.

According to the above descriptions, the base station and the user equipment provided by the present invention are with prioritized transmission considerations. The prioritized transmission considerations are achieved by embedding an information element regarding the PHY layer and an information element regarding the MAC layer in an RRC configuration message. The information element regarding the PHY layer is associated with a DCI format for a specific indication, wherein the specific indication is related to a prioritized transmission mode (e.g. high reliability, preemption prohibition). The information element regarding the PHY layer defines a search space of a DCI for the specific indication, and the DCI derived in the search space is related to the first prioritized transmission mode. The information element regarding the MAC layer defines a transmission restriction of each of a plurality of logical channels, wherein at least one of the transmission restrictions corresponds to the prioritized transmission mode. The base station transmits the RRC configuration message to the user equipment so that the user equipment learns the information elements from the RRC configuration message.

Thereafter, the base station and the user equipment can utilize the DCI format in various ways to schedule the packets in the logical channels. As the DCI format is designated for a specific indication related to a prioritized transmission mode, the packets in the logical channels will be scheduled with prioritized transmission considerations. Therefore, the URLLC and TSN requirements can be thoroughly achieved, and duplication efficiency will not be impaired.

The above disclosure is related to the detailed technical contents and inventive features thereof. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station, comprising:
   a transceiving interface; and
   a processor, being electrically connected to the transceiving interface and configured to generates a Radio Resource Control (RRC) configuration message for a user equipment,
   wherein the RRC configuration message comprises a first information element regarding a Physical (PHY) layer, the first information element is associated with a Downlink Control Information (DCI) format for a specific indication, and the specific indication is related to a first prioritized transmission mode,
   wherein the RRC configuration message further comprises a second information element regarding a Medium Access Control (MAC) layer, the second information element defines a transmission restriction of each of a plurality of logical channels, and at least one of the transmission restrictions corresponds to the first prioritized transmission mode,
   wherein the transceiving interface further transmits the RRC configuration message to the user equipment.

2. The base station of claim 1, wherein the first information element is configured to define a search space of a DCI for the specific indication, and the DCI derived in the search space is related to the first prioritized transmission mode.

3. The base station of claim 1, wherein the transceiving interface further transmits a DCI having the DCI format to the user equipment so that the user equipment arranges a packet from the logical channel having the transmission restriction corresponding to the first prioritized transmission mode to a granted resource indicated by the DCI and transmits the packet on the granted resource, and the transceiving interface further receives the packet from the user equipment.

4. The base station of claim 1, wherein the RRC configuration message further comprises a third information element regarding one of the PHY layer and the MAC layer, the third information element records a prioritization threshold,
   wherein the transceiving interface further transmits a DCI having the DCI format to the user equipment so that the user equipment calculates a prioritization weight for each of the logical channels according to the corresponding transmission restriction and arranges a packet from the logical channel having the prioritization weight greater than the prioritization threshold to a granted resource indicated by the DCI and transmits the packet on the granted resource, and the transceiving interface further receives the packet from the user equipment.

5. The base station of claim 1, wherein the RRC configuration message further comprises a third information element regarding one of the PHY layer and the MAC layer, the third information element records a prioritization threshold,
wherein the transceiving interface further transmits a DCI having the DCI format to the user equipment,
wherein a plurality of packets are in the logical channels, each of the packets is of a packet size, the user equipment calculates a prioritization weight for each of the packets according to the corresponding transmission restriction and the corresponding packet size, arranges the packet having the prioritization weight greater than the prioritization threshold to a granted resource indicated by the DCI, and transmits the packet being arranged on the granted resource,
wherein the transceiving interface further receives the packet being arranged from the user equipment.

6. The base station of claim 1, wherein the processor further generates a prioritized Packet Data Convergence Protocol (PDCP) entity, the prioritized PDCP entity has the first prioritized transmission mode, a Data Radio Bearer (DRB) is associated with the prioritized PDCP entity uniquely, the RRC configuration message further comprises a third information element regarding a PDCP layer, and the third information element defines that one of the logical channels is dedicated for the DRB associated with the prioritized PDCP entity,
wherein the transceiving interface further transmits a DCI having the DCI format to the user equipment so that the user equipment arranges a packet from the logical channel dedicated for the DRB associated with the prioritized PDCP entity to a granted resource indicated by the DCI and transmits the packet on the granted resource, and the transceiving interface further receives the packet from the user equipment.

7. The base station of claim 6, wherein the processor further configures a piece of MAC information for indicating that the first prioritized transmission mode is activated.

8. The base station of claim 6, wherein one of the third information element and a fourth information element is for indicating that a token associated with the prioritized PDCP entity is activated, and the user equipment arranges the packet to the granted resource in response to the receipt of the token.

9. The base station of claim 1, wherein the RRC configuration message further comprises a third information element, the third information element defines that one of a plurality of DRBs is a prioritized DRB, the prioritized DRB corresponds to the first prioritized transmission mode, the third information element further defines that one of the logical channels is dedicated for the prioritized DRB,
wherein the transceiving interface further transmits a DCI having the DCI format to the user equipment so that the user equipment arranges a packet from the logical channel dedicated for the prioritized DRB to a granted resource indicated by the DCI and transmits the packet on the granted resource, and the transceiving interface further receives the packet from the user equipment.

10. The base station of claim 1, wherein the RRC configuration message further comprises a third information element regarding a PDCP layer, and the third information element indicates that an end mark usage corresponding to the first prioritized transmission mode is activated.

11. The base station of claim 1, wherein the transceiving interface further receives a prioritization establishment cause from the user equipment, and the processor configures the first information element and the second information element in response to the prioritization establishment cause.

12. The base station of claim 1, wherein the transceiving interface further broadcasts a system information indicating that a second prioritized transmission mode is activated.

13. A user equipment, comprising:
a transceiving interface, being configured to receive an RRC configuration message from a base station; and
a processor, being electrically connected to the transceiving interface and configured to read a first information element regarding a PHY layer from the RRC configuration message, the first information element is associated with a DCI format for a specific indication, the specific indication is related to a first prioritized transmission mode,
wherein the processor further reads a second information element regarding a MAC layer from the RRC configuration message, the second information element defines a transmission restriction of each of a plurality of logical channels, and at least one of the transmission restrictions corresponds to the first prioritized transmission mode.

14. The user equipment of claim 13, wherein the first information element is configured to define a search space of a DCI for the specific indication, and the DCI derived in the search space is related to the first prioritized transmission mode.

15. The user equipment of claim 13, wherein the transceiving interface further receives a DCI having the DCI format from the base station, the processor further arranges a packet from the logical channel having the transmission restriction corresponding to the first prioritized transmission mode to a granted resource indicated by the DCI, and the transceiving interface further transmits the packet on the granted resource.

16. The user equipment of claim 13, wherein the processor further reads a third information element regarding one of the PHY layer and the MAC layer from the RRC configuration message, the third information element records a prioritization threshold,
wherein the transceiving interface further receives a DCI having the DCI format from the base station, the processor further calculates a prioritization weight for each of the logical channels according to the corresponding transmission restriction, the processor further arranges a packet from the logical channel having the prioritization weight greater than the prioritization threshold to a granted resource indicated by the DCI, and the transceiving interface further transmits the packet on the granted resource.

17. The user equipment of claim 13, wherein the processor further reads a third information element regarding one of the PHY layer and the MAC layer from the RRC configuration message, the third information element records a prioritization threshold,
wherein the transceiving interface further receives a DCI having the DCI format from the base station,
wherein a plurality of packets are in the logical channels, each of the packets is of a packet size, the processor further calculates a prioritization weight for each of the packets according to the corresponding transmission restriction and the corresponding packet size, the processor further arranges the packet having the prioritization weight greater than the prioritization threshold to a granted resource indicated by the DCI, and the transceiving interface further transmits the packet being arranged on the granted resource.

18. The user equipment of claim 13, wherein a prioritized PDCP entity has the first prioritized transmission mode, a DRB is associated with the prioritized PDCP entity uniquely, the processor further read a third information element regarding a PDCP layer from the RRC configuration message, and the third information element defines that one of the logical channels is dedicated for the DRB associated with the prioritized PDCP entity,
wherein the transceiving interface further receives a DCI having the DCI format from the base station, the processor further arranges a packet from the logical channel dedicated for the DRB associated with the prioritized PDCP entity to a granted resource indicated by the DCI, and the transceiving interface further transmits the packet on the granted resource.

19. The user equipment of claim 18, wherein the transceiving interface further receives a piece of MAC information from the base station, and the piece of MAC information indicates that the first prioritized transmission mode is activated.

20. The user equipment of claim 18, wherein the processor further reads one of the third information element and a fourth information element to learn that a token associated with the prioritized PDCP entity is activated, and the processor arranges the packet to the granted resource in response to the receipt of the token.

21. The user equipment of claim 13, wherein the processor further reads a third information element from the RRC configuration message, the third information element defines that one of a plurality of DRBs is a prioritized DRB, the prioritized DRB corresponds to the first prioritized transmission mode, the third information element further defines that one of the logical channels is dedicated for the prioritized DRB,
wherein the transceiving interface further receives a DCI having the DCI format from the base station, the processor further arranges a packet from the logical channel dedicated for the prioritized DRB to a granted resource indicated by the DCI, and the transceiving interface further transmits the packet on the granted resource.

22. The user equipment of claim 13, wherein the processor further reads a third information element regarding a PDCP layer from the RRC configuration message, the third information element indicates that an end mark usage corresponding to the first prioritized transmission mode is activated, and the processor adds at least one end mark to the packet.

23. The user equipment of claim 13, wherein the transceiving interface further transmits a prioritization establishment cause to the base station.

24. The user equipment of claim 13, wherein the transceiving interface further receives a system information from the base station, and the system information indicates that a second prioritized transmission mode is activated.

* * * * *